March 18, 1969  A. ARUTUNOFF  3,433,986
OIL FILLED ELONGATED SUBMERGIBLE ELECTRIC MOTOR
Filed June 13, 1966

INVENTOR
ARMAIS ARUTUNOFF

BY *(signature)*

ATTORNEY

United States Patent Office 3,433,986
Patented Mar. 18, 1969

3,433,986
OIL FILLED ELONGATED SUBMERGIBLE ELECTRIC MOTOR
Armais Arutunoff, Bartlesville, Okla., assignor to Reda Pump Company, Bartlesville, Okla., a corporation of Delaware
Filed June 13, 1966, Ser. No. 557,115
U.S. Cl. 310—87
Int. Cl. H02k 5/10, 5/12
7 Claims

ABSTRACT OF THE DISCLOSURE

An elongated electric motor for deep wells wherein the radial bearing support for the rotor comprises the peripheral surface of the rotor, running against the bore of the stator. This rotor bearing surface is formed by applying a layer of non-magnetic metal thereto, which runs against the stator bore with a running clearance.

---

This invention relates to electric motors for pumps employed in deep oil or water wells, and consists more particularly in new and useful improvements in an elongated electric motor wherein the radial bearing support for the rotor comprises the surface of the rotor itself which surface is formed by a layer of non-magnetic metal running against the bore of the stator with a running clearance.

Deep wells of this type are usually provided with casings of from 3″–6″ inside diameter, and in some instances, are of a depth as great as 10,000 feet. Thus, in order to meet effective production needs, considerable horsepower is required for driving the multi-stage centrifugal pumps employed. Because of the limitation of diameter due to the casing size, the necessary power can only be obtained by increasing the length of the electric motor, it having been found that a single motor of a length as great as 20 feet is not sufficient, even if the motor is two-pole, 60 cycles, and runs at 3,540 r.p.m.

One of the problems to be contended with in an elongated motor, such as required to efficiently operate these deep well, multi-stage, centrifugal pumps is that of providing radial bearings for the rotor which revolves at high speed, as well as the problem of relative elongation and contraction of the rotor shaft, and the rotor length versus the stator. Such an elongation and contraction in practice may be of the order in excess of ¼ inch. When in operation, the rotor, being centrally located, acquires a considerably higher temperature than the stator, due to that fact that the stator is surrounded by well fluid which draws the heat away from the stator.

The primary object of the present invention is to provide a practical solution of these bearing and elongation and contraction problems.

Another object of the invention is to provide an elongated, electric motor having a new type of rotor which is protected from endangering iron to iron contact between its periphery and the bore of the stator.

A further object of the invention is to provide a rotor, the periphery of which is encased by a layer of non-magnetic material which provides radial bearing support for the rotor.

A still further object of the invention is to provide a rotor of this type having its periphery covered with a layer of such non-magnetic metals as babbit, solder, bronze or chromium electrodeposited on the surface of the rotor iron.

Still another object of the invention is to provide a two-directional thrust bearing, remote from the rotor and stator, to position and support the rotor.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
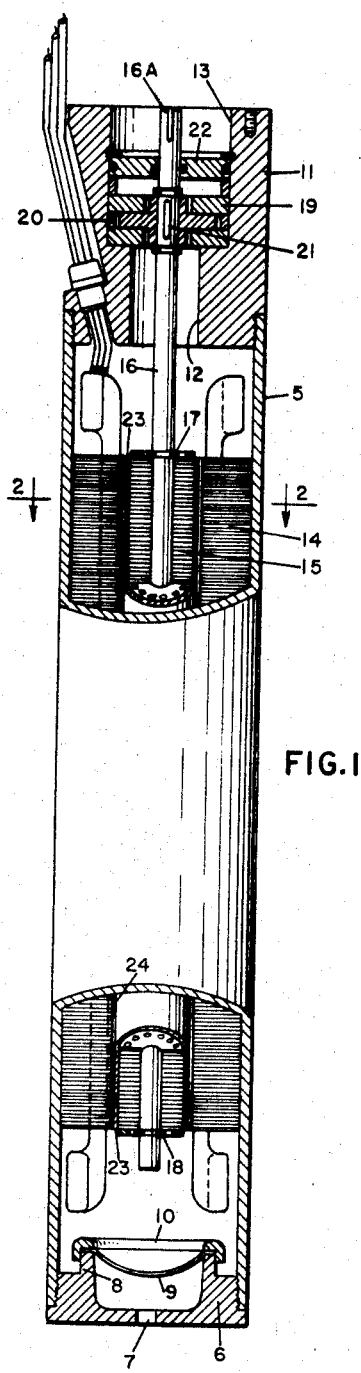
FIG. 1 is a longitudinal, sectional view of a motor constructed in accordance with the invention.
Figure 2:
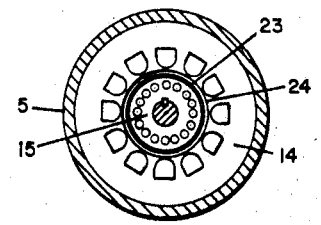
FIG. 2 is a transverse, sectional view taken on line 2—2 of FIG. 1.
Figure 3:
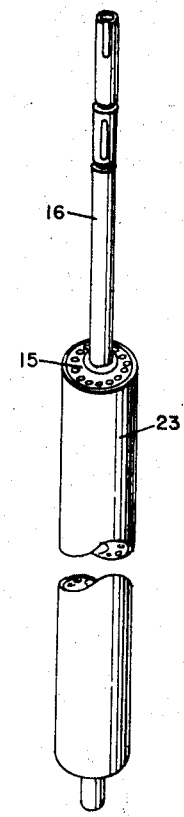
FIG. 3 is a perspective view, partially broken away, illustrating a rotor assembly of my invention.

In the drawings, referring first to FIG. 1, the motor housing 5 has a bottom closure 6 provided with a vent 7. Concentric with the vent 7 and projecting into the housing is an annular, upstanding flange 8 which is integral with the closure 6, and provides a support for a flexible membrane 9 which is secured in place by a suitable collar 10. As will later appear, the housing 5 is filled with oil, and this membrane and vent structure are designed to compensate for expansion and contraction of the oil in the housing.

The motor housing 5 is designed for coaxial connection to the lower end of a pump unit (not shown) by means of an annular member 11 which fits into and closes the upper end of the housing. The member 11 is provided with a central, longitudinally extending opening 12 for receiving the rotor shaft, and this opening is enlarged at its upper extremity as at 13 to provide a chamber for the rotor thrust bearings, hereinafter referred to.

The housing 5 encloses a stator 14, within the bore of which a novel squirrel-cage type rotor 15 is disposed. The rotor shaft 16 projects through the rotor, which is secured in place on the shaft by upper and lower snap collars 17 and 18, respectively. The upper end 16a of the shaft 16 projects through the opening 12 in member 11 and terminates within the bearing chamber 13 where it is supported by a two directional thrust bearing 19, the runner 20 of which is keyed to the shaft as at 21. The end of the shaft is splined for connection to the coaxial shaft of a centrifugal pump (not shown). As previously indicated, the interior of the housing 5 is filled with lubricating oil which is retained by the membrane 9 and the upper shaft seal 22.

The periphery of the rotor 15 is encased by a sleeve 23 comprising a tight fitting layer of non-magnetic material, preferably a non-magnetic metal of high electrical conductivity, the outside diameter of the encased rotor being of a diameter to provide a running clearance between the rotor and the bore 24 of the stator 14. Thus, in operation, the layer or sleeve 23 encasing the rotor in running clearance surface contact with the bore of the stator, provides radial bearing support for the rotor without the need of any additional radial bearings.

It will be apparent that a single rotor of considerable length may be employed in a motor constructed in accordance with this invention due to the radial bearing support provided by the sleeve 23. The proper location of the rotor with respect to the stator is fixed by the two directional thrust bearing 19, which does not interfere with expansion and contraction of the rotor and rotor shaft.

While I have shown and described the casing 23 as being in the nature of a sleeve, tube or cylinder of non-magnetic material pressed on and tight fitting the periphery of the rotor, a suitable casing may be formed by spraying, babbitting, electrolytically depositing or dip-coating the periphery of the rotor with suitable material to form a casing of the desired thickness. Any material may be employed as the casing in either of its forms, so long as it has the proper friction resisting properties and is non-magnetic. However, it must be noted that a high conductivity non-magnetic metal is preferred, as the casing 23 of my invention acts usefully, the same as conductors of the rotor do, and induced currents in the casing add to the torque of the motor in the same manner as is afforded by lowering of the rotor-winding resistance.

From the foregoing, it is believed that the invention may be readily understood by those skilled in the art without further description, it being borne in mind that numerous changes may be made in the details disclosed without departing from the spirit of the invention as set forth in the following claims.

I claim:

1. An oil filled, submergible, electric motor for deep wells, comprising a housing, an elongated stator having a central bore in said housing, a correspondingly elongated rotor disposed in said bore, a driveshaft secured to said rotor, a two-directional thrust bearing supporting one end of said shaft and spaced longitudinally from said rotor and stator for positioning and supporting said rotor, and a relatively thin casing of non-magnetic material on the periphery of said rotor, having a running clearance within the bore of said stator, whereby the encased periphery of said rotor, bearing against the surface of the stator bore, provides the sole radial bearing support for said rotor.

2. A motor as claimed in claim 1, wherein said casing is composed of non-magnetic metal.

3. A motor as claimed in claim 1, wherein said casing comprises a cylinder of non-magnetic, bronze-like material.

4. A motor as claimed in claim 1, wherein said casing comprises a cylinder of chromium material.

5. A motor as claimed in claim 1, wherein said casing comprises a coating of babbit-like material.

6. A motor as claimed in claim 1, wherein said casing substantially fills the usual annular air-gap space between said rotor and stator, leaving sufficient running clearance.

7. A motor as claimed in claim 1, wherein said rotor is of the squirrel-cage type.

References Cited

UNITED STATES PATENTS

| | | | |
|---|---|---|---|
| 1,433,827 | 10/1922 | Kimble | 310—211 |
| 1,607,287 | 11/1926 | Laffoon | 310—261 X |
| 1,970,484 | 8/1934 | Arutunoff | 310—157 X |
| 2,781,464 | 2/1957 | Timms | 310—90 |
| 2,842,729 | 7/1958 | Hillman | 310—166 X |
| 3,291,056 | 12/1966 | Steinman | 310—90 X |
| 3,347,168 | 10/1967 | Nixon | 310—90 X |

WARREN E. RAY, *Primary Examiner.*

U.S. Cl. X.R.

310—90